(12) United States Patent
Wildman et al.

(10) Patent No.: US 6,704,087 B2
(45) Date of Patent: Mar. 9, 2004

(54) PHOTOGRAPHIC PROCESSING SYSTEM

(75) Inventors: Nigel R. Wildman, Watford (GB); Roy King, Hemel Hempstead (GB)

(73) Assignee: Eastman Kodak Company, Rochester, NY (US)

( * ) Notice: Subject to any disclaimer, the term of this patent is extended or adjusted under 35 U.S.C. 154(b) by 18 days.

(21) Appl. No.: 10/164,068

(22) Filed: Jun. 5, 2002

(65) Prior Publication Data
US 2003/0012574 A1 Jan. 16, 2003

(30) Foreign Application Priority Data

Jun. 12, 2001 (GB) .............................. 0114263

(51) Int. Cl.[7] .......................... G03B 27/32; G03D 3/02; G03D 3/04; G03D 3/06
(52) U.S. Cl. .......................... 355/27; 355/28; 396/613; 396/625; 396/634; 396/635
(58) Field of Search ............................ 355/27, 28, 40, 355/54; 396/625, 634, 635, 613

(56) References Cited

U.S. PATENT DOCUMENTS

| | | | |
|---|---|---|---|
| 3,728,953 A | * 4/1973 | Morse ........................ 134/94.1 |
| 3,840,214 A | * 10/1974 | Merz .......................... 366/199 |
| 4,473,283 A | 9/1984 | Bernhardt et al. |
| 4,708,451 A | * 11/1987 | Wing et al. .................. 396/598 |
| 5,502,534 A | 3/1996 | Lynch et al. |
| 5,861,942 A | * 1/1999 | Ohsone et al. ................ 355/27 |
| 5,867,747 A | * 2/1999 | Lynch et al. ................. 396/626 |
| 6,020,984 A | 2/2000 | Hasegawa et al. |
| 6,100,994 A | * 8/2000 | Schliekelmann et al. .. 358/1.15 |
| 6,173,992 B1 | * 1/2001 | Manico et al. ................ 283/67 |
| 6,246,462 B1 | * 6/2001 | Ackermann et al. .......... 355/32 |
| 6,295,117 B2 | * 9/2001 | Haraguchi et al. ............ 355/40 |
| 6,490,024 B1 | * 12/2002 | Othno ......................... 355/27 |
| 6,545,747 B2 | * 4/2003 | Yoshida et al. ............... 355/40 |

FOREIGN PATENT DOCUMENTS

JP   11 305341   11/1999

* cited by examiner

Primary Examiner—Alan A. Mathews
(74) Attorney, Agent, or Firm—Frank Pincelli

(57) ABSTRACT

A method of processing a print order in which the entire order is delivered simultaneously. An exposed sheet carrying all the latent images of the order is developed in a single processing space.

21 Claims, 3 Drawing Sheets

PHOTOGRAPHIC PROCESSING SYSTEM

CROSS REFERENCE TO RELATED APPLICATIONS

This is a U.S. original patent application which claims priority on Great Britain patent application No. 0114263.7 filed Jun. 12, 2002.

FIELD OF THE INVENTION

This invention relates to the field of photographic processing, in particular to the field of processing photographic paper.

BACKGROUND OF THE INVENTION

In the field of color photographic paper processing it is desirable to reduce the time from exposure to print delivery. This is desirable in order to, for example, reduce customer waiting times, enable other services such as allowing the customer to select the images desired, and increase productivity. In the past this reduction in time from exposure to print delivery has been achieved by various means. The linear speed of the media in the processing machine has been increased at the expense of machine size and more rapid processes have been introduced into the marketplace to achieve productivity benefits in smaller machines. In the minilab sector, machine size cannot be increased appreciably because of constraints on machine "footprint". Bigger machines usually mean larger tanks, hence the utilization of such machines needs to be high to stop degradation of the chemicals.

PROBLEM TO BE SOLVED BY THE INVENTION

Conventional continuous processing machines expose and process images in a serial fashion. There is, therefore, a time lag between the first print emerging from the machine and the last print. This time lag can be several minutes in duration depending upon the machine. Smaller minilabs have the longest time lag since to be small they must be slow. If the images could be processed in a parallel fashion, such that the first and the last images were processed together, the time to deliver the images could be drastically reduced.

SUMMARY OF THE INVENTION

The present invention is directed to overcoming one or more of the problems set forth above. Briefly summarized, according to one aspect of the present invention, a processor which enables a whole series of images to be produced at one time is provided.

According to the present invention there is provided a method of processing a print order comprising the steps of supplying a sheet of output media, exposing the sheet to form latent images of all images in the print order, developing the exposed sheet in a single processing space and drying the developed sheet, the entire print order being delivered simultaneously.

The present invention further provides apparatus for processing a print order comprising means for supplying a sheet of output media, means for exposing the sheet to form latent images of all images in the print order, a single processing space in which the exposed sheet is developed and drying means for drying the developed sheet, the entire print order being output simultaneously.

Preferably the single processing space is a rotatable drum chamber.

ADVANTAGEOUS EFFECT OF THE INVENTION

The processor of the invention provides numerous advantages. The whole order of prints arrives at the same time. Therefore, there is no waiting time between delivery of the first print and delivery of the last. The processing time for each order is shorter than the processing time of an equivalent size order processed in a conventional continuous processing machine using the same amount of chemistry. The processor has a smaller footprint than a conventional continuous machine.

The processing takes place at close to current replenishment rates. As the processing is done in batch mode there are no standing solutions of the processing chemistry. This has further advantages such as: no process control is required as fresh solutions are used for each batch order; no control strips are therefore required; and, as there are no standing solutions, there are less odors. Moreover, the processor is self-cleaning so less time is required for maintenance.

The processor is suitable for low utilization environments and is office compatible due to the apparently dry operation.

The invention allows use of rapid RX process and very unstable chemistry. It is possible to use wider rolls of print media than used in conventional processing which reduces finishing and packaging costs. Enlargements of prints up to the maximum drum size are possible.

The cost and productivity of this process are very competitive against inkjet and thermal processes.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

The processor for use with the invention is not specific to the invention. What is important is the mode of operation of the processor which imparts certain features that are of use to the processing machine operator. The processor should have the ability to remove the need for processing control and should be self-cleaning. A suitable processor is disclosed in U.S. application Ser. No. 09/920,495; filed Aug. 1, 2001 by Peter Jeffrey Twist et al; entitled PROCESSING PHOTOGRAPHIC MATERIAL the contents of which are herein incorporated by reference. However, the invention is not limited to such a processor. Any batch processor which is self-cleaning could be used. Alternative examples of suitable processors are described below.

Figure 1:
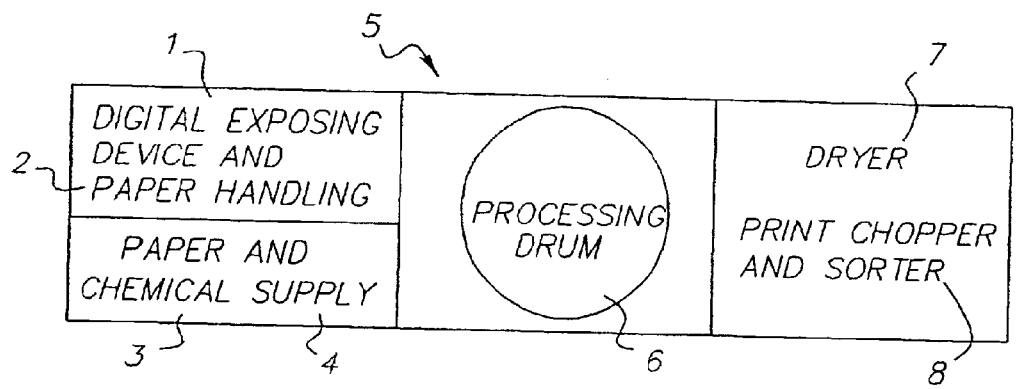
FIG. 1 is a schematic diagram of the processing device.

FIG. 1 is a schematic diagram of the processing device 5. The processing device 5 includes a plurality of units. These units include a digital exposing device 1, paper handling means 2, paper supply means 3, chemical supply means 4, a processing drum 6, a drier 7, and means 8 to chop and sort the output prints.

Although a paper supply means is illustrated it will be understood that any suitable print media is intended and included.

The rolls of paper, or any other suitable print media, supplied by the paper supply means 3 are of large width. The widths may range from 12" (30.5 mm) to 28" (71.1 mm). Images are exposed onto the paper in a matrix fashion by the digital exposing device 1. Any suitable digital writing device may be used to expose the image. A sheet can contain enlargements, panoramics, or even be one large print of a single image. The sheet can be up to 75" (190.5 mm) long depending on the number of images required. This reduces waste. The exposed sheet is fed into the processing drum 6. Processing chemicals are supplied from the chemical supply means 4 to the processing drum 6. The minimum volume of processing solution is supplied. The whole sheet is then processed in the rotating processing drum 6 in the minimum volume of solution. The process can be any one defined, for example, RA, Rapid RA, RX with unstable solutions for low silver paper, or even a rapid RX process which may only be stable when mixed for a minute or two. After processing, the print is washed while it is still in the processing drum 6. The processing drum 6 is also washed and then cleaned. Therefore, no chemical deposits build up and the need for operator maintenance is simplified if not completely removed. As the processing drum 6 does not contain chemicals between processes, the machine will emit fewer odors and be apparently dry. This, together with its size, allows the processing machine to be transportable without off-loading the chemicals from the machine. After leaving the processing drum 6 the resulting prints are dried in the dryer 7. The prints are then chopped and sorted before being returned to the customer.

Figure 2A:
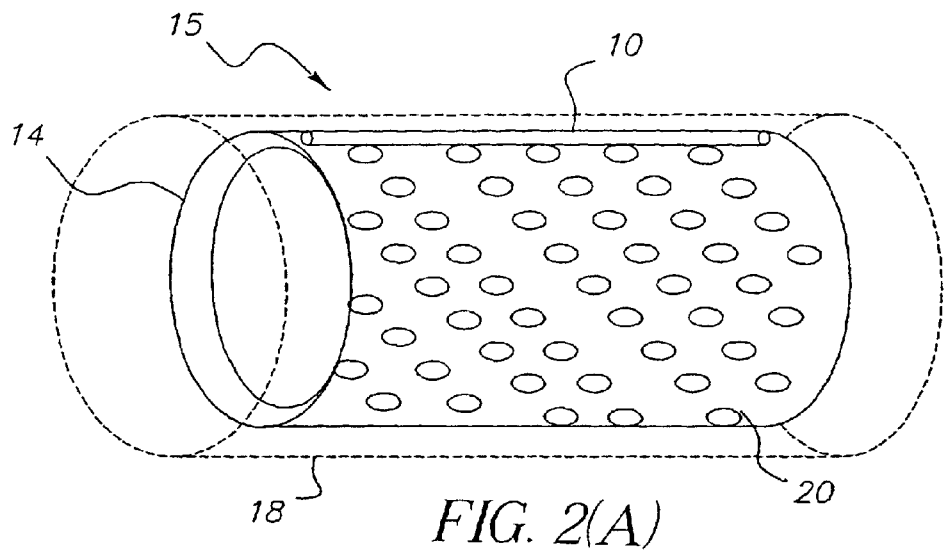
FIGS. 2A and 2B show a processor suitable for use in the present invention.
Figure 2B:
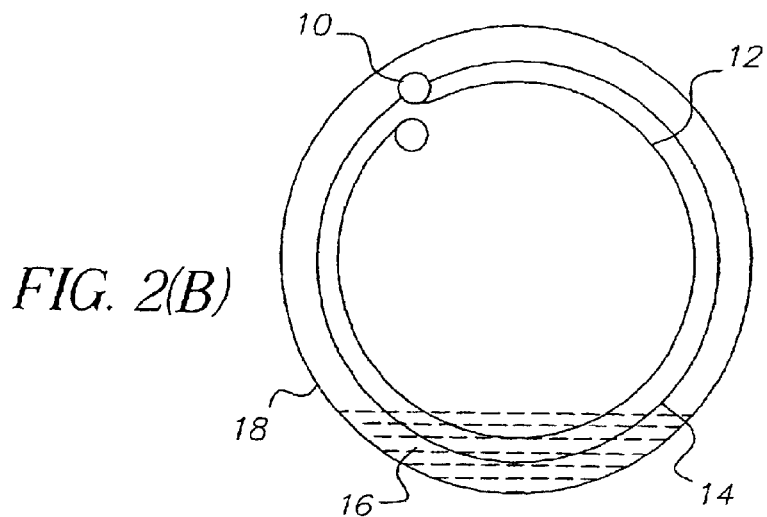

FIGS. 2A and 2B show a processor 15 suitable for use with the present invention. The processor 15 comprises an inner drum 14 and an outer drum 18. The drums 14, 18, are coaxial, the inner drum 14 being rotatable within the outer drum 18. The outer drum 18 is static. The inner drum 14 is provided with a plurality of perforations 20. A roller, not illustrated, may be provided within drum 14. Pinch rollers 10 are located at the entrance to the inner drum 14.

This processor works in a similar way to a print drum such as that manufactured by Jobo or any other small-scale darkroom apparatus maker. The print media 12 is fed into the inner drum 14 via the pinch rollers 10. The emulsion side of the print media 12 faces towards the center of the inner drum 14. A small amount of processing solution is introduced into the outer drum 18 and forms a pool 16 therein. Due to the close proximity of the walls of the outer and inner drum walls, 18 and 14, respectively, this also forms a pool in the inner drum 14. The outer drum 18 remains static while the inner perforated drum 14 rotates. As the inner drum 14 rotates, the pool of processing solution 16 is coated onto the print media 12. The coating can be aided by a roller (not shown) running on the print surface. Solutions are added and removed sequentially for each required step of the processing, ending with the wash step. The wash step washes both the print media 12, the inner drum 14, and the outer drum 18. When the process is completed the inner drum 14 remains empty until the next print media 12 is to be processed.

Figure 3:
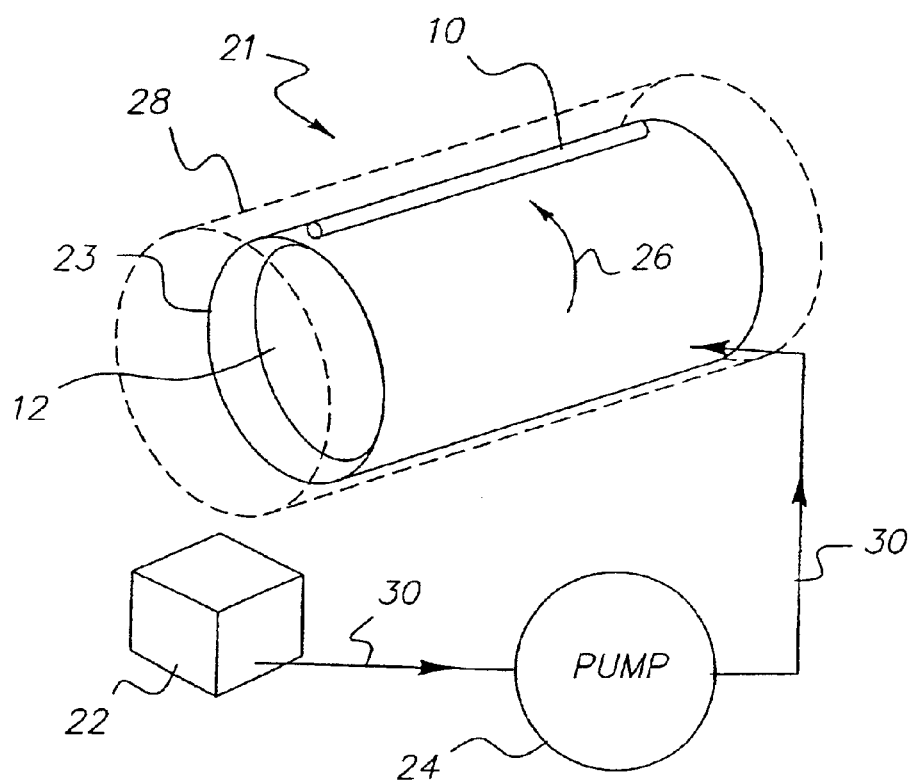
FIG. 3 shows a further processor for use in the present invention.

FIG. 3 shows a further processor 21 suitable for use with the present invention. This processor 21 also comprises an inner drum 23 and an outer drum 28. The drums are coaxial, the inner drum 23 being rotatable within the outer drum 28. The outer drum 28 is static. Pinch rollers 10 are located at the entrance to the inner drum 23. The drums, 26 and 28 are tilted at 5–20° to the horizontal. At the lower end of the processor 21 there is provided a container 22. Supply pipes 30 connect the container 22 to the upper end of the processor 21. A pump 24 is provided in the supply pipes 30.

The print media 12 is fed into the inner drum 23 via the pinch rollers 10. The pinch rollers 10 hold the print media 12 in position during processing. The emulsion side of the media faces towards the center of the inner drum 23. The processing solution is contained within container 22. The pump 24 is started and the solution is pumped from the container 22 and introduced into the upper end of the processor, into the rotating inner drum 23. The outer drum 28 remains static. Due to the tilting of the processor, the solution that is introduced at the top of the rotating inner drum 23 runs down the print media surface to the bottom by gravity. The solution that drips from the inner drum 23 is collected in the container 22. This solution is pumped back through the supply pipes 30 to be reapplied to the print media 12 during the process. This ensures efficient use of the processing chemicals. After the process, the solution is discarded. The outer drum 28 is empty unless the pump 24 is running. Therefore, no solution is left in the outer drum 28 when processing is complete. The outer drum 28 remains empty until the next print media 12 is to be processed.

This processor 21 can be modified if the width of the print media 12 to be used is narrower than the axial length of the inner drum 23. This prevents waste of the print media 12. The processor 21 can be modified to allow processing in a volume commensurate with the print media 12 area rather than the outer drum 28 area. In order to do this the solution delivery point to the drum is lowered into the outer drum 28, i.e. the solution is not delivered to the top end of the outer drum 28 but further down the axial length thereof. Therefore, the outer drum 28 is not wet all over. The print media 12 is always loaded with one edge at the lower end of the inner drum 23.

The common feature of the processors 5, 15, and 21, is that the final prints are delivered out of the machine at the same time. If the prints are cut, the time from first to last print does not exceed one minute.

Figure 4:
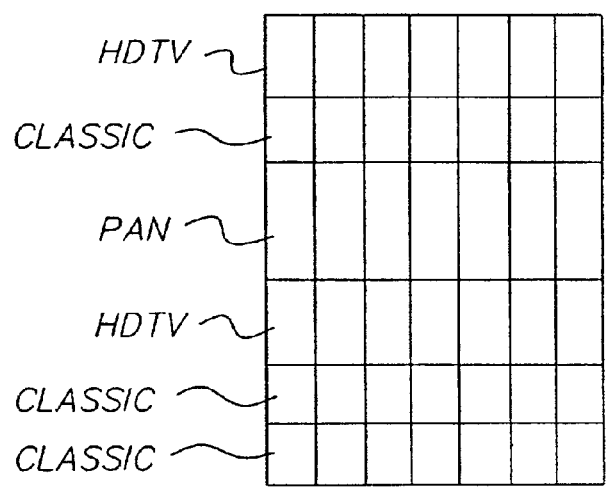
FIG. 4 illustrates how a sheet of media may be divided for different size prints.

The sheet of print media 12 that the machine processes needs to be large to accommodate a customer's order of prints within its dimensions. If some of those prints are panoramic in format, the area of paper is increased again. The print media 12, for example paper, needs to be of such dimensions so that it can be accommodated around a reasonably sized inner drum. This will allow the machine to have a small "footprint" relative to a continuous machine. If the paper layout is such that the print width is divided up into 4" sections along its width, then it can be easily cut with rotating knives along its long axis, see FIG. 4. The print length can then be chopped following the process by current knife technology.

Various sized prints can be exposed digitally up to the maximum size that the inner drum can take. It is thought that a common width paper would be delivered to the exposing head, the length of the print being dependant upon the number of prints and their size, see Table 1.

TABLE 1

Drum and print sizes

| Print Size | No. of Exposures | Individual Print Width (inches) | No. of Prints Across | Macro Print Width/ Drum Width (inches) | Macro Print Length (inches) | Drum Diameter to Accommodate Print Length (inches) |
|---|---|---|---|---|---|---|
| 6" prints classic | 40 | 4 | 6 | 24 | 42 | 13 |
| 7" prints HDTV | 40 | 4 | 6 | 24 | 49 | 16 |
| 10" prints PAN | 40 | 4 | 6 | 24 | 70 | 22 |
| 11" US PAN | 40 | 4 | 6 | 24 | 77 | 25 |
| 6" prints classic | 40 | 4 | 7 | 28 | 36 | 11 |
| 7" prints HDTV | 40 | 4 | 7 | 28 | 42 | 13 |
| 10" prints PAN | 40 | 4 | 7 | 28 | 60 | 19 |
| 11" US PAN | 40 | 4 | 7 | 28 | 66 | 21 |
| 6" prints classic | 36 | 4 | 6 | 24 | 36 | 11 |
| 7" prints HDTV | 36 | 4 | 6 | 24 | 42 | 13 |
| 10" prints PAN | 36 | 4 | 6 | 24 | 60 | 19 |
| 11" US PAN | 36 | 4 | 6 | 24 | 66 | 21 |
| 6" prints classic | 25 | 4 | 5 | 20 | 30 | 10 |
| 7" prints HDTV | 25 | 4 | 5 | 20 | 35 | 11 |
| 10" prints PAN | 25 | 4 | 5 | 20 | 50 | 16 |
| 11" US PAN | 25 | 4 | 5 | 20 | 55 | 18 |

Software can work out the best possible "fit" to minimize paper waste. An inner drum of the invention can be made to accommodate 40 exposures, 6–7 prints wide, 4" (101 mm) prints with a diameter between 20–25 inches (508 mm to 635 mm). As exposure is by digital means, the machine can also print and process double-sided album pages and other customized layouts which are attractive to the customer and the business.

EXAMPLE 35 mm×12" strips of Kodak Edge 8 were exposed to a 4 color (R,G,B,N) 21 step tablet. These strips were processed in Kodak RA Prime SP (single part) developer tank solution for 45 seconds at 37.8° C. and Kodak RA Prime Bleach-Fixer Replenisher for 45 seconds at 37.8° C. in a sinkline using nitrogen burst agitation. The resulting sensitometry was read on a spectral array densitometer. These strips constitute the control.

For the drum processor, a drum, which can accommodate 2.5 ft (762 mm) of 35 mm film, was used. The drum is heated by being housed in a hot air box at 40° C., the processing solutions (Kodak RA Prime SP Replenisher and 20% acetic acid stop bath) were also heated to 40° C. Color paper with two step wedge exposures on it (as described above) was loaded into the inner drum by taping down its leading edge to the drum wall, with the emulsion side of the paper facing the center of the inner drum. A plain PVC roller of 1 " (2.54 cm) diameter is able to run on the paper surface as the inner drum rotates. This is held at the 6 o'clock position of the inner drum by a bracket. The inner drum was rotated at 60 rpm.

The replenishment rates for the Kodak RA Prime process in a continuous machine are as follows;

| Solution | Average utilization ml/ft2 | Low utilization ml/ft2 |
|---|---|---|
| Developer | 15 (or 10 for Kodak RA Prime Single Part)☐ | 20 |
| Bleach-fix | 10 | 20 |
| Stabilizer 23 | 23 | |

We wish to find the minimum developer volume that can be used to develop color paper to give good sensitometry. The goal is to try to match the replenishment rates of the continuous minilab process to be efficient in chemistry.

Paper was processed in the drum processor using the following volume of developer and stop-bath.

| Volume added to Drum processor ml | Effective replenishment rate ml/ft2 |
|---|---|
| 6 | 21 |

The strips were then removed and bleach-fixed in the tankline. The sensitometry illustrated in FIG. 5 was obtained. The plot includes the Kodak RA Prime sinkline check as a dashed line.

Figure 5:
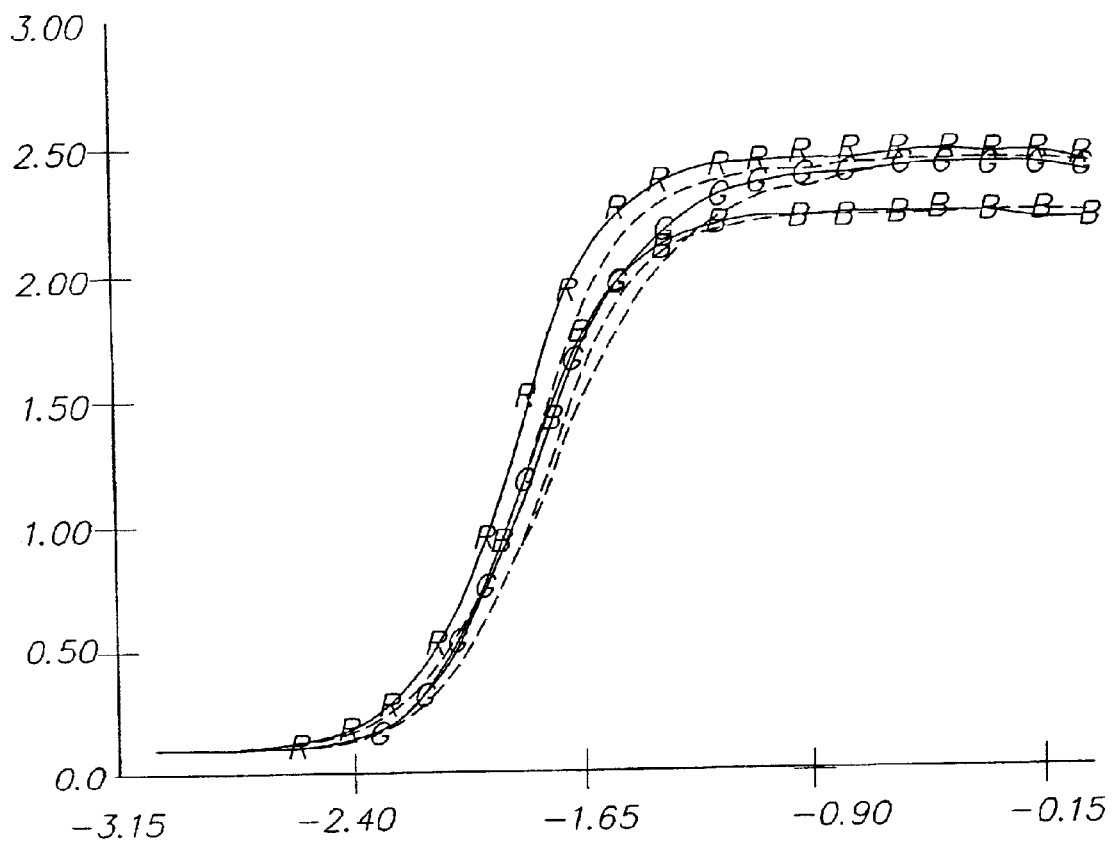
FIG. 5 is a graph illustrating experimental results obtained.

It can be seen from FIG. 5 that at a volume of 21 ml/ft$^2$ the paper processed very well with few defects. It is apparent from the sensitometry that there are slight speed increases in this processor, attributable to the higher agitation environment. The volume of developer used was close to the low utilization replenishment rate of 20 ml/ft$^2$. As this machine has advantages for low utilization environments, this is a fair comparison.

The invention has been described in detail with reference to preferred embodiments thereof. It will be understood by those skilled in the art that variations and modifications can be effected within the scope of the invention.

Parts List

1 digital exposing device
2 paper handling means
3 paper supply means
4 chemical supply means
5 processing device
6 processing drum
7 dryer
8 print chopper and sorter
10 pinch rollers
12 print media
14 inner drum
15 processor
16 pool of processing solution
18 outer drum
20 perforations
21 processor
22 container
23 inner drum
24 pump 28 outer drum
30 supply pipes

What is claimed is:

1. A method of processing a print order comprising the steps of supplying a sheet of output media, exposing the sheet to form latent images of all images in the print order, developing the exposed sheet in a single processing space and drying the developed sheet, the entire print order being delivered simultaneously.

2. A method as claimed in claim 1 wherein the single processing space rotates during development of the exposed sheet.

3. A method as claimed in claim 2 wherein the single processing space is tilted.

4. A method as claimed in claim 3 wherein the single processing space is tilted at angle of between 5° and 20° to the horizontal.

5. A method as claimed in claim 4 wherein processing solution may be introduced into the single processing space at any point along the axial length thereof.

6. A method as claimed in claim 5 wherein processing solution is re-circulated through the single processing space.

7. A method as claimed in claim 1 wherein the sheet of output media is digitally exposed.

8. A method as claimed in claim 1 wherein the print order is delivered as double-sided prints.

9. A method as claimed in claim 1 wherein the print order is delivered as an album page.

10. A method as claimed in claim 1 wherein the print order comprises different size prints.

11. A method as claimed in claim 1 wherein the print order is customized to each individual customer.

12. Apparatus for processing a print order comprising means for supplying a sheet of output media, means for exposing the sheet to form latent images of all images in the print order, a single processing space in which the exposed sheet is developed and drying means for drying the developed sheet, the entire print order being output simultaneously.

13. Apparatus as claimed in claim 12 wherein the single processing space is a rotatable drum chamber.

14. Apparatus as claimed in claim 12 wherein the single processing space comprises an inner drum and an outer drum.

15. Apparatus as claimed in claim 14 wherein the inner drum is rotatable and the outer drum is fixed.

16. Apparatus as claimed in claim 15 wherein the inner drum is perforated.

17. Apparatus as claimed in claim 16 wherein a roller member is included in said inner drum.

18. Apparatus as claimed in claim 13 wherein the drum chamber is tilted.

19. Apparatus as claimed in claim 18 wherein the drum chamber is tilted at an angle of between 5° and 20° to the horizontal.

20. Apparatus as claimed in claim 13 including pump means for re-circulating processing solution through the drum chamber.

21. Apparatus as claimed in claim 18 adapted to allow processing solution to be added at any point along an axial length thereof.

* * * * *